(12) United States Patent
Schultz

(10) Patent No.: US 6,625,997 B1
(45) Date of Patent: Sep. 30, 2003

(54) AUTOMOTIVE AIR CONDITIONING SYSTEM

(75) Inventor: Frederick K. Schultz, Bringhurst, IN (US)

(73) Assignee: Delphi Technologies, Inc., Troy, MI (US)

( * ) Notice: Subject to any disclaimer, the term of this patent is extended or adjusted under 35 U.S.C. 154(b) by 27 days.

(21) Appl. No.: 10/015,118

(22) Filed: Oct. 26, 2001

(51) Int. Cl.[7] .............................. F25D 17/04; G01K 1/08
(52) U.S. Cl. ............................. 62/186; 62/227; 374/147
(58) Field of Search ........................... 374/147; 62/129, 62/227, 186; 165/11, 1

(56) References Cited

U.S. PATENT DOCUMENTS 3,961,495 A * 6/1976 Beauvent et al. .............. 62/140

6,386,272 B1 * 5/2002 Starner et al. .......... 162/125 X

* cited by examiner

*Primary Examiner*—William Wayner
(74) *Attorney, Agent, or Firm*—Stefan V. Chmielewski

(57) ABSTRACT

An automotive air conditioning system is provided comprising a duct for introducing a flow of air into a vehicle cabin, a closed-loop refrigeration circuit including a condenser and an evaporator, a temperature sensor arrange in the duct for measuring the temperature of the evaporator, and a control unit for selectively commanding operation of the system in accordance with the measured temperature of the evaporator. In a preferred embodiment, the temperature sensor comprises an infrared (IR) temperature sensor that is remotely positioned downstream of the evaporator such that the sensor can measure the temperature of a downstream surface of the evaporator. The use of an infrared temperature sensor allows the temperature of substantially the entire downstream surface of the evaporator to be measured instead of a small finite area of the evaporator.

26 Claims, 1 Drawing Sheet

AUTOMOTIVE AIR CONDITIONING SYSTEM

TECHNICAL FIELD

The present invention relates to an automotive air conditioning system and, more particularly, to an automotive air conditioning system with automatic control of refrigeration compressor capacity and inlet air mixing door.

BACKGROUND OF THE INVENTION

Automotive air conditioning systems that include a duct for introducing air into a cabin and a refrigeration circuit comprising a compressor and an evaporator are known in the art. In a typical automotive air conditioning system, the speed of the compressor is mechanically linked to the speed of an internal combustion engine. A problem encountered in these systems is that continuous operation of the compressor, especially during low cooling demand, causes the temperature of the evaporator to become extremely cold, allowing moisture in contact with the core to turn into ice. This "frosting up" inhibits air flow through the evaporator causing the cooling capacity of the air conditioning system to deteriorate, which compromises passenger comfort.

To prevent the evaporator from becoming too cold, typical automotive air conditioning systems include a means to control the capacity of the compressor. In conventional automotive air conditioning systems, the capacity of the compressor is generally controlled by (i) varying the displacement of a variable displacement compressor or (ii) modulating the duty cycle of a clutch driven compressor. Determining whether to modify the capacity of the compressor requires an evaluation of the evaporator operating conditions.

One evaluation approach is to attach a temperature sensitive device, such as a thermistor, directly to the evaporator to measure the temperature of the evaporator. A control unit is provided for switching off or varying the displacement of a compressor when the detected temperature of the evaporator is lower than a predetermined value to prevent the evaporator from "frosting-up." A limitation of this approach is that the thermistor measures the temperature at a finite point on the surface of the evaporator, permitting the control system to turn off or vary the displacement of the compressor when only small portion of the evaporator is too cold.

Another evaluation approach is to insert a pressure sensitive device, such as a pressure switch, into a refrigeration line entering or exiting the evaporator to measure the pressure of the evaporator. As the evaporator cools, the pressure of the refrigerant circulating through the evaporator decreases. The control unit switches off or varies the displacement of the compressor when the detected pressure of the evaporator is lower than a predetermined value to prevent the evaporator from "frosting-up." A limitation of this approach is that the pressure switch measures the pressure at a finite point in the refrigeration circuit. As the surface of the evaporator becomes contaminated with debris in the duct, the relationship between the pressure (temperature) of the refrigerant and the surface temperature of the evaporator changes allowing the control system to turn off or vary the displacement of the compressor prematurely.

Another problem encountered in a typical automotive air conditioning system is when the heat load on the vehicle exceeds the cooling capacity of the air conditioning system. Once the cooling capacity has been exceeded, passenger comfort can no longer be guaranteed. Factors that contribute to insufficient cooling capacity can be characterized in two basic categories: environmental factors and mechanical factors. The primary environmental factors are the outside air temperature, humidity of the outside air and solar load on the vehicle. The primary mechanical factors are compressor speed, effectiveness of the evaporator and air flow through the evaporator. Numerous combinations of these factors help contribute to the heat load on a vehicle exceeding the cooling capacity of the vehicle air conditioning system.

The cooling capacity of an air conditioning system can be improved if a portion of the unconditioned (outside) air flow over the evaporator is replaced with conditioned (re-circulated) air from the vehicle cabin. Because conditioned air is generally cooler and dryer than unconditioned air, the use of conditioned air can reduce the load on the air conditioning system. However, excessive use of conditioned air causes the vehicle cabin to become too dry, leading to passenger discomfort, such as, for example, dry eyes. Therefore, many automotive air conditioning systems are designed to use only enough conditioned air as needed for the system to meet the heat load on the vehicle.

In typical air conditioning systems, an air mix door is used to regulate the amount of conditioned air that is mixed with the unconditioned (outside) air. The control unit used to control the capacity of the compressor may also function to regulate the position of the air mix door and, correspondingly, the amount of conditioned air flowing through the evaporator. The control unit typically employs a temperature/pressure sensitive device, as described above, to determine if the evaporator is too warm, indicating the heat load on the vehicle has exceeded the cooling capacity. As described above, a limitation of this approach is that the system is unable to ascertain the temperature of the entire evaporator because conventional temperature sensitive devices measure the temperature at a finite point on the surface of the evaporator and conventional pressure sensitive devices measure the pressure at a finite point in the refrigeration circuit.

SUMMARY OF THE INVENTION

An automotive air conditioning system is provided comprising a duct for introducing a flow of air into a vehicle cabin and a closed-loop refrigeration circuit including a compressor for circulating a refrigerant through the circuit and an evaporator arranged in the duct to contact the air flow such that an exchange of heat occurs between refrigerant in the evaporator and the air in the duct. The air conditioning system further includes a temperature sensor arranged in the duct for measuring the temperature of the evaporator and a control unit for selectively commanding operation of the system in accordance with the measured temperature of the evaporator. The duct includes an outside air inlet and an inside air inlet separated by an air mix door that regulates the amount of inside (re-circulated) air introduced into the duct.

In a preferred embodiment, the temperature sensor comprises an infrared (IR) temperature sensor that is preferably positioned downstream of the evaporator to remotely measure the temperature of a downstream surface of the evaporator. The use of an infrared (IR) temperature sensor allows the temperature of substantially the entire downstream surface of the evaporator to be measured instead of a small finite area of the evaporator. The sensor transmits an output signal to the control unit, which corresponds to an average measured temperature of the downstream surface of the evaporator. The control unit processes the output signal and initiates a control function to control operation of the air conditioning system in accordance with the measured temperature of the evaporator.

According to one control function, the control unit compares the measured temperature of the evaporator to a first predetermined reference temperature. If the measured evaporator temperature falls below the first reference temperature, the control unit reduces the cooling capacity of the refrigeration circuit to prevent a "frosting up" of the evaporator. The control unit reduces the cooling capacity of the refrigeration circuit by reducing the capacity of the compressor, such as by shutting off or reducing the displacement of the compressor.

According to another control function, the control unit compares the measured temperature of the evaporator to a second predetermined reference temperature. If the measured evaporator temperature exceeds the second reference temperature, the control unit adjusts the position of the air mix door to increase the amount of conditioned air re-circulated through the evaporator, thereby reducing the heat load on the system.

The use of a an infrared (IR) sensor advantageously enables the control unit to perform a control function based on the temperature of substantially an entire surface of evaporator 16, as opposed to a small finite area of the evaporator. Among other advantages, the product development time of a vehicle employing the inventive air conditioning system is substantially reduced because extensive testing is no longer required to determine the best location of conventional sensors. Environmental factors, such as changes in elevation and atmospheric pressure, which impact the performance of conventional air conditioning system sensors, have no impact on an infrared sensor. Since an infrared sensor examines a substantial portion of the evaporator surface, the compressor is permitted to operate at maximum capacity until a significant portion of the evaporator is deemed too cold. Because an infrared sensor is a non-contacting measurement device, corrosion and contamination on the surface of the evaporator will generally not effect the temperature measurement.

BRIEF DESCRIPTION OF THE DRAWING

The present invention will now be described, by way of example, with reference to the accompanying drawing, in which.

DESCRIPTION OF THE PREFERRED EMBODIMENT

Figure 1:
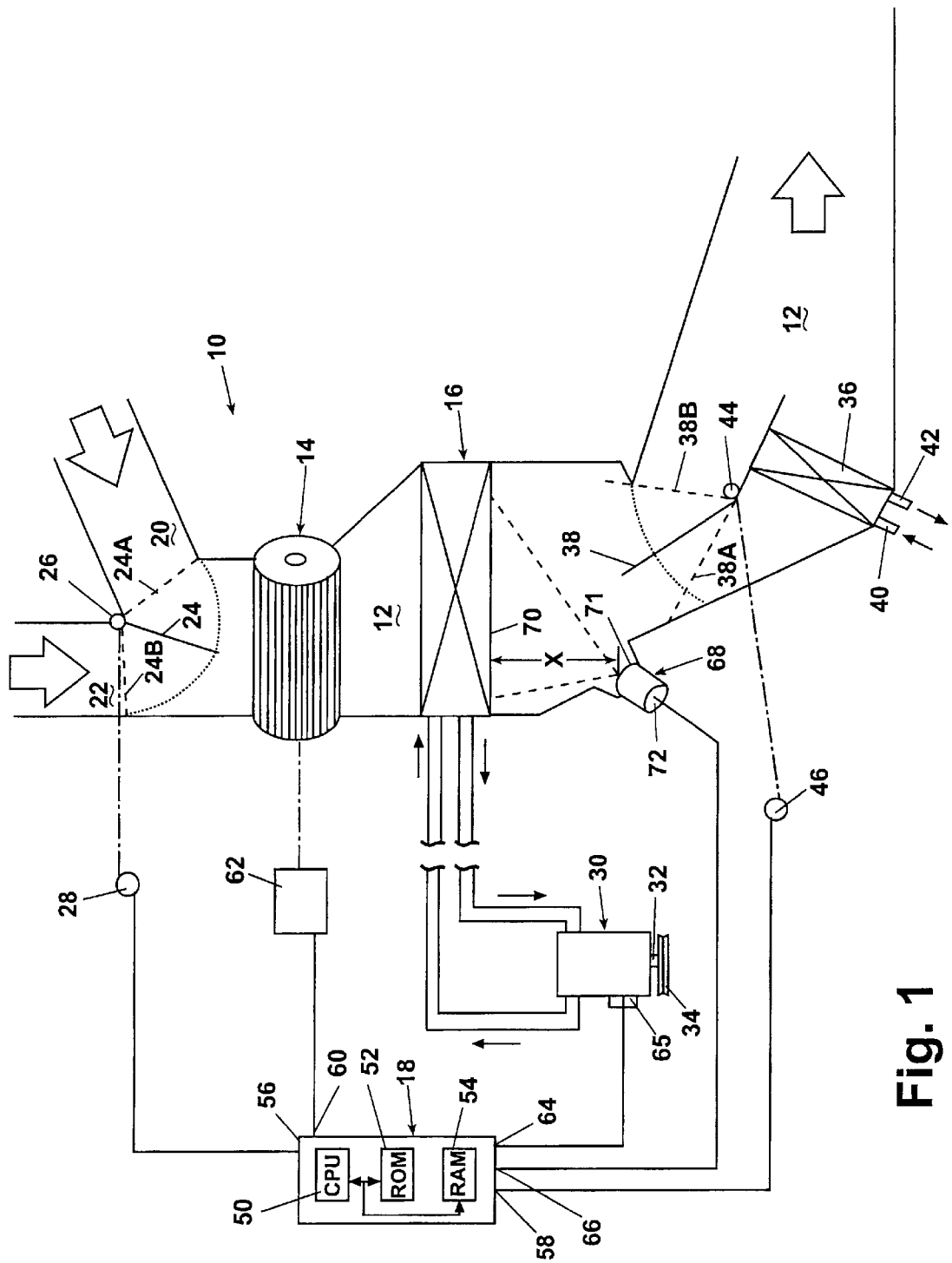
FIG. 1 is a schematic view of an air conditioning system according to the present invention.

Referring now to the drawing, the preferred embodiments of the present invention are described in detail. Referring to FIG. 1, an air conditioning system 10 for use in an automobile is illustrated. The system 10 generally includes a duct 12 for introducing air into a cabin of the automobile, a blower 14 arranged in duct 12 for generating air flow in duct 12 directed toward the automobile cabin, an evaporator 16 for cooling the air from the blower 14 and an electrical control unit 18 generating electric control signals for controlling operation of system 10.

Duct 12 is, at its inlet side, provided with a first or inside air inlet 20, a second or outside air inlet 22, and an air mix door 24, which is rotatable about an axis 26 for blending the air entering from the inside and outside inlets 20 and 24. The door 24 is formed as a plate member and is connected to a servomotor 28, which acts as a drive motor for obtaining the rotating movement of door 24 about the axis 26. Door 24 is moved between a first position 24A, where inside air inlet 20 is closed, so that all air traveling through the evaporator is from outside the vehicle, and a second position 24B, where outside air inlet 22 is closed, so that all air traveling through the evaporator is from inside the vehicle. Furthermore, door 24 may take any desired position between the first and second extreme positions 24A and 24B. In place of the plate type door 24, as shown in FIG. 1, a film type damper, which is itself well known in the art, may be employed. Furthermore, in place of servomotor 28, a stepping motor or other drive means known in the art may be employed for providing a rotating movement of door 24.

The evaporator 16 preferably extends across the entire width of duct 12 allowing an exchange of heat to take place between the flow of refrigerant in evaporator 16 and the air flow in duct 12, thereby cooling the air flow. The evaporator 16, together with a compressor 30, comprise the main components of a closed loop refrigeration system. Although not illustrated in FIG. 1, the refrigerant system may also include a receiver, a condenser and an expansion valve. During operation, high pressure gaseous refrigerant from compressor 30 is condensed into a liquid state at the condenser (not illustrated). A transformation of the liquid state refrigerant takes place at the expansion valve (not illustrated), where the pressure of the liquid refrigerant is reduced. The refrigerant at a reduced pressure is, at the evaporator 16, evaporated and directed back to the compressor 30 to complete the refrigeration cycle.

As illustrated in FIG. 1, compressor 30 is provided with a rotating shaft 32 having a pulley 34 with a clutch (not shown) connected to a crankshaft (not shown) of an internal combustion engine via a belt (not shown), so that a rotational movement of the crankshaft is transmitted to compressor 30 when the clutch is engaged. In other words, an engaged condition of the clutch causes compressor 30 to be operated, which allows the refrigeration system to be operated, so that the air contacting the evaporator 16 is cooled. By controlling the engagement (activation) and disengagement (deactivation) of the clutch, the cooling capacity of the refrigerant system can be controlled. Alternatively, the compressor 30 may be a variable displacement type compressor, which is itself well known in the art. The displacement of the compressor may be adjusted to modify the capacity of the compressor 30 to vary the cooling capacity of the refrigeration system.

The temperature of the air discharged from evaporator 16 may be modified by a heater core 36 and an air mix door 38 located between the evaporator 16 and the heater core 36. The heater core 36 exchanges heat between air flowing in duct 12 and engine cooling water flowing into heater core 36. The heater core 36 has an inlet 40 for receiving the cooling water at a high temperature from an internal combustion engine, and an outlet 42 for returning the engine cooling water after heat is exchanged with the air flow in duct 12.

Air mix door 38, which is arranged between the evaporator 16 and the heater core 36, comprises a plate member capable of rotating about an axis 44. Door 38 is connected to a servomotor 46 so that door 38 is moved between a first position 38A, where a path to heater core 36 is closed, forcing all of the air from evaporator 16 to by-pass the heater core 36, and a second position 38B, where the path to heater core 36 is opened, so that all of the air from evaporator 16 passes through heater core 36. Furthermore, air mix door 38 may take any desired position between the first and second extreme positions 38A and 38B. As a result, the amount of the air passed through the heater core 36, i.e., the ratio of the amount of cool air by-passing heater core 36 to the amount of cool air passing through heater core 36, is continually controlled in accordance with the position of door 38. Thus, a continuous control of the temperature of the air entering the vehicle cabin as a mixture of the cool air and the hot air is obtained. As described above, in place of the plate door 38, the air mixing device may be constructed as a film damper. Furthermore, in place of the servomotor 46, a stepping motor or other drive means may be employed for providing a rotating movement of door 38.

Control unit 18 is constructed as a microcomputer unit, which is of a type known in the art. Control unit 18 generally includes a central processing unit (CPU) 50, a read only memory (ROM) 52 and a random access memory (RAM) 54. Programs and data are stored in memory 52 and 54 for executing the various control operations according to the present invention. The control unit 18 is provided with terminals 56 and 58 connected to the servomotors 28 and 46, respectively, for issuing control signals for operating doors 24 and 38, respectively. The control unit 18 is further provided with a terminal 60 connected to a blower drive circuit 62 for operating blower 14. The control unit 18 is further provided with a terminal 64 connected to a compressor control circuit 65, which is connected to compressor 30 for selectively operating the clutch (not shown) or for varying the displacement of compressor 30. Control unit 18 further includes a terminal 66 that is connected with a sensor 68 used to measure the temperature of evaporator 16. Although not illustrated, control unit 18 may be further provided with terminals that connect to an air inlet selection switch, a temperature setting switch and a mode selection switch located in the cabin of the vehicle. Furthermore, the control unit 18 may be provided with additional terminals (not illustrated), which are connected to a sensor for detecting the inside air temperature, a sensor for detecting the outside air temperature, a sensor for detecting an engine cooling water temperature, and a sensor for detecting a sun radiation level in the vehicle cabin.

Sensor 68 is a temperature-sensing device capable of remotely measuring the temperature of evaporator 16. In a preferred embodiment, sensor 68 is an infrared (IR) sensor that is positioned in a wall of duct 12 at a predetermined distance X downstream of evaporator 16. The distance X downstream of evaporator 16 is a function of the surface area of a downstream surface 70 of evaporator 16 and the field of view of sensor 68. In a preferred embodiment, sensor 68 is positioned a distance X downstream of evaporator 16 such that the sensor's 68 field of view encompasses substantially the entire downstream surface 70 of evaporator 16. Care must be taken to insure that non-active evaporator core components, such as, for example, support brackets and seals, are not within the field of view of sensor 68 so as to dilute the temperature measurement. The use of an infrared (IR) temperature sensor advantageously allows the temperature of substantially the entire downstream surface 70 of evaporator 16 to be measured instead of a small finite area of evaporator 16 as described in the prior art. Although the preferred position of sensor 68 has been described, it will be appreciated by those skilled in the art that sensor 68 may be located anywhere in duct 12 that provides an unobstructed field of view of a substantial portion of a surface of evaporator 16.

Sensor 68 is preferably removed a certain distance from the interior surface of duct 12, as illustrated in FIG. 1, to protect it from moisture droplets that form on the downstream surface 70 of evaporator 16 and dislodge from surface 70 due to the force of moving air. However, sensor 68 is preferably positioned such that a face 71 at least partially interferes with the air flow in duct 12, thereby forcing air flow across the face 71 to prevent the accumulation of moisture and dirt.

Sensor 68 further includes an output 72 for selectively transmitting an output signal to control unit 18. In a preferred embodiment, the output signal represents a real time average temperature of the downstream surface 70 of evaporator 16. The control unit 18 receives the output signal via terminal 66 and processes the output signal according to logic rules stored in memory 52 to execute various control functions for selectively commanding operation of air conditioning system 10 in accordance with the measured temperature of evaporator 16.

A first, control function according a preferred embodiment prevents evaporator 16 from "frosting up" or otherwise forming thereon a sufficient amount of ice that would impede the flow of air through duct 12. The first control function is performed by control unit 18 when the temperature of a significant portion of the downstream surface 70 of evaporator 16 drops below a first predetermined reference temperature ($T_{R1}$). The control unit 18 continuously monitors the output signal received from sensor 68, which is indicative of the average surface temperature ($T_S$) of evaporator 16, and compares the output signal to the first reference temperature ($T_{R1}$). The first reference temperature ($T_{R1}$) is preprogrammed into control unit 18 and represents a temperature above the freezing point of water, such as, for example 38–40° F. (3.3–4.4° C.).

When the downstream surface temperature ($T_S$) of evaporator 16 drops below the first reference temperature ($T_{R1}$), control unit 18 transmits a control signal to control circuit 65 commanding a reduction in the capacity of compressor 30. Depending on the type of compressor used in the refrigerant system (i.e., clutch versus variable displacement), a reduction in compressor capacity may be commanded, for example, by control unit 18 instructing the compressor clutch to disengage or by control unit 18 commanding a reduction in the displacement of compressor 30. As the capacity of compressor 30 is reduced, the relatively warmer air in duct 12 flowing through evaporator 16 reverses the formation of ice crystals. Control unit 18 may subsequently increase the compressor capacity, such as by instructing the compressor clutch to engage, when the surface temperature ($T_S$) of evaporator 16 achieves a predetermined temperature above first reference temperature ($T_{R1}$). Thus, substantially "frost-free" operation of evaporator 16 may be provided by modulating the duty cycle of the compressor clutch, or by varying the displacement of compressor 30, in accordance with the measured surface temperature ($T_S$) of evaporator 16.

Measuring the temperature of substantially the entire downstream surface 70 of evaporator 16 prevents control unit 18 from initiating a control function when the temperature of only a small portion of evaporator 16 exceeds the first predetermined reference temperature ($T_{R1}$). Accordingly, the first control function prevents the evaporator 16 from "frosting up" without substantially effecting the cooling capacity of air conditioning system 10.

A second control function according to a preferred embodiment enhances the cooling capacity of the air conditioning system 10 when the heat load on the vehicle exceeds the cooling capacity of air conditioning system 10. The cooling capacity of air conditioning system 10 may be enhanced if a portion of the unconditioned (outside) air entering duct 12 is replaced with conditioned (inside) air. The mixture of conditioned and unconditioned air entering duct 12 is controlled by the position of air mix door 24. The required position of air mix door 24 is commanded by control unit 18 after analysis of the output signal of sensor 68 corresponding to the downstream surface temperature ($T_S$) of evaporator 16.

As described above, control unit 18 continuously monitors the output signal received from sensor 68 and compares the output signal to a second predetermined reference temperature value ($T_{R2}$) stored in memory 52 of control unit 18. The control unit 18 may filter the output signal of sensor 68 to prevent an instant response, in the form of a control function, to the measured temperature of evaporator 16. Employing a filter to prevent premature system response prevents, inter alia, obtrusive cabin noise due to conditions, such as, for example, repetitive actuation of air mix door 24 and excessive compressor cycling.

If it is determined that the surface temperature ($T_S$) of evaporator 16 exceeds a second predetermined reference temperature ($T_{R2}$), control unit 18 transmits a control signal to servomotor 28 commanding the position of air mix door 24 be modified. The relative position of air mix door 24 may depend not only upon how much the surface temperature ($T_S$) exceeds the second predetermined reference temperature ($T_{R2}$), but also upon other factors, such as, for example, the speed of blower 14, the outside air temperature, the cabin air temperature and the vehicle speed. As surface temperature ($T_S$) of evaporator 16 increases, the amount of conditioned air re-circulated through evaporator 16 increases, thereby enhancing the cooling capacity of system 10. Alternatively, as the surface temperature ($T_S$) of evaporator 16 decreases, the amount of conditioned air re-circulated through evaporator 16 decreases.

Sensor 68 allows air conditioning system 10 to adapt to a wide range of environmental and mechanical factors, such as, for example, changes in atmospheric pressure or compressor speed, minimizing the build-up of water on evaporator 16. Sensor 68 measures the temperature of substantially the entire downstream surface 70 of evaporator 16 preventing control unit 18 from initiating a control function when the temperature of only a small portion of evaporator 16 exceeds the second predetermined reference temperature ($T_{R2}$). Accordingly, the amount of conditioned (inside) air re-circulated through evaporator 16 may be effectively controlled to enhance the cooling capacity of refrigeration system 10 without re-circulating an excessive amount of conditioned air.

While operation of air conditioning system 10 has been described with reference to the control functions described above, it will be appreciated by those skilled in the art that other control functions may be executed by control unit 18 in accordance with the output signal of sensor 68. For example, control unit 18 may regulate the position of air mix door 38 in accordance with the measured surface temperature of evaporator 16. In another example, as the heat load on the system is reduced, control unit 18 may increase the temperature of surface 70 by reducing the operating time of compressor 30 instead of adjusting the position of air mix door 38. This control function allows the relative humidity level within the vehicle to be increased while simultaneously reducing the energy consumed by operation of compressor 30.

The use of a an infrared (IR) sensor 68 advantageously enables control unit 18 to perform a control function based on the temperature of substantially an entire surface of evaporator 16, as opposed to a small finite area of evaporator 16. Among other advantages, product development time of a vehicle employing air conditioning system 10 is substantially reduced because extensive testing is no longer required to determine the best location of conventional temperature sensors or the best type of pressure sensor. Environmental factors, such as changes in elevation and atmospheric pressure, which impact the performance of conventional pressure sensors, have no impact on an infrared sensor. Since an infrared sensor examines a substantial portion of the evaporator surface, the compressor is permitted to operate at a maximum capacity until a significant portion of the evaporator is deemed to be too cold. Because the infrared sensor is a non-contacting measurement device, corrosion and contamination on the surface of the evaporator will not effect the temperature measurement.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A closed-loop refrigeration circuit, comprising:
   a compressor for circulating a refrigerant through the circuit;
   an evaporator arranged to contact a flow of air such that an exchange of heat occurs between refrigerant in the evaporator and the air flow; and
   an infrared temperature to remotely measure the temperature of a surface of the evaporator, wherein the infrared temperature sensor measures the temperature of a downstream surface of the evaporator, wherein a field of view of the infrared temperature sensor is substantially the entire downstream surface of the evaporator.

2. The circuit according to claim 1, wherein the temperature sensor includes an output for selectively transmitting an output signal.

3. The circuit according to claim 2, wherein the output signal represents an average surface temperature of the evaporator.

4. The circuit according to claim 1, wherein the compressor is a clutch actuated compressor.

5. The circuit according to claim 4, wherein a duty cycle of the compressor clutch is modulated in accordance with the measured temperature of the evaporator.

6. The circuit according to claim 1, wherein the compressor is a variable displacement compressor.

7. The circuit according to claim 6, wherein the displacement of the compressor is varied in accordance with the measured temperature of the evaporator.

8. A system for conditioning the air of a vehicle cabin, comprising:
   a duct for introducing a flow of air into the vehicle cabin;
   a closed-loop refrigeration circuit comprising a compressor and an evaporator, the evaporator arranged in the duct to contact the air flow such that an exchange of heat occurs between refrigerant in the evaporator and the air in the duct;
   a temperature sensor disposed in the duct to remotely measure the temperature of a surface of the evaporator; and
   a control unit for selectively commanding operation of the air conditioning system in accordance with the measured surface temperature of the evaporator, wherein the temperature sensor is an infrared temperature sensor, wherein a field of view of the infrared temperature sensor is substantially the entire downstream surface of the evaporator.

9. The system according to claim 8, wherein the temperature sensor measures the temperature of a downstream surface of the evaporator.

10. The system according to claim 8, wherein the temperature sensor includes an output for selectively transmitting an output signal, the control unit having a terminal that receives the output signal, the control unit configured to produce a control signal that corresponds to the commanded operation of the air conditioning system.

11. The system according to claim 10, wherein the output signal represents an average surface temperature of the evaporator.

12. The system according to claim 10, wherein the control unit filters the output signal received from temperature sensor.

13. The system according to claim 8, wherein the compressor is a clutch actuated compressor.

14. The system according to claim 13, wherein the control unit controls engagement and disengagement of the clutch.

15. The system according to claim 13, wherein selectively commanding operation of the air conditioning system comprises modulating the duty cycle of the compressor clutch in accordance with the measured temperature of the evaporator.

16. The system according to claim 8, wherein the compressor is a variable displacement compressor.

17. The system according to claim 16, wherein the control unit controls the displacement of the compressor.

18. The system according to claim 16, wherein selectively commanding operation of the air conditioning system comprises varying the displacement of the compressor in accordance with the measured temperature of the evaporator.

19. The system according to claim 8 further including a blower for producing a flow of air through the duct.

20. The system according to claim 19, wherein the temperature of the flow of air exiting the evaporator is a function of the surface temperature of the evaporator and the speed of the blower.

21. The system according to claim 8, wherein the duct includes an outside air inlet, an inside air inlet and an air mix door positioned substantially between the outside air inlet and the inside air inlet.

22. The system according to claim 21, wherein selectively commanding operation of the air conditioning system comprises modifying the position of the air mix door in accordance with the measured temperature of the evaporator.

23. The system according to claim 22, wherein the air mix door is actuated in a direction that increases the flow of inside air into the duct when the surface temperature of the evaporator increases.

24. The system according to claim 22, wherein the air mix door is actuated in a direction that decreases the flow of inside air into the duct when the surface temperature of the evaporator decreases.

25. A closed-loop refrigeration circuit, comprising:
a compressor for circulating a refrigerant through the circuit;
an evaporator arranged to contact a flow of air such that an exchange of heat occurs between refrigerant in the evaporator and the air flow; and
an infrared temperature to remotely measure the temperature of a surface of the evaporator, wherein the temperature sensor includes an output for selectively transmitting an output signal, wherein the output signal represents an average surface temperature of the evaporator.

26. A system for conditioning the air of a vehicle cabin, comprising:
a duct for introducing a flow of air into the vehicle cabin;
a closed-loop refrigeration circuit comprising a compressor and an evaporator, the evaporator arranged in the duct to contact the air flow such that an exchange of heat occurs between refrigerant in the evaporator and the air in the duct;
a temperature sensor disposed in the duct to remotely measure the temperature of a surface of the evaporator; and
a control unit for selectively commanding operation of the air conditioning system in accordance with the measured surface temperature of the evaporator, wherein the temperature sensor includes an output for selectively transmitting an output signal, the control unit having a terminal that receives the output signal, the control unit configured to produce a control signal that corresponds to the commanded operation of the air conditioning system, wherein the output signal represents an average surface temperature of the evaporator.

* * * * *